Patented June 30, 1942

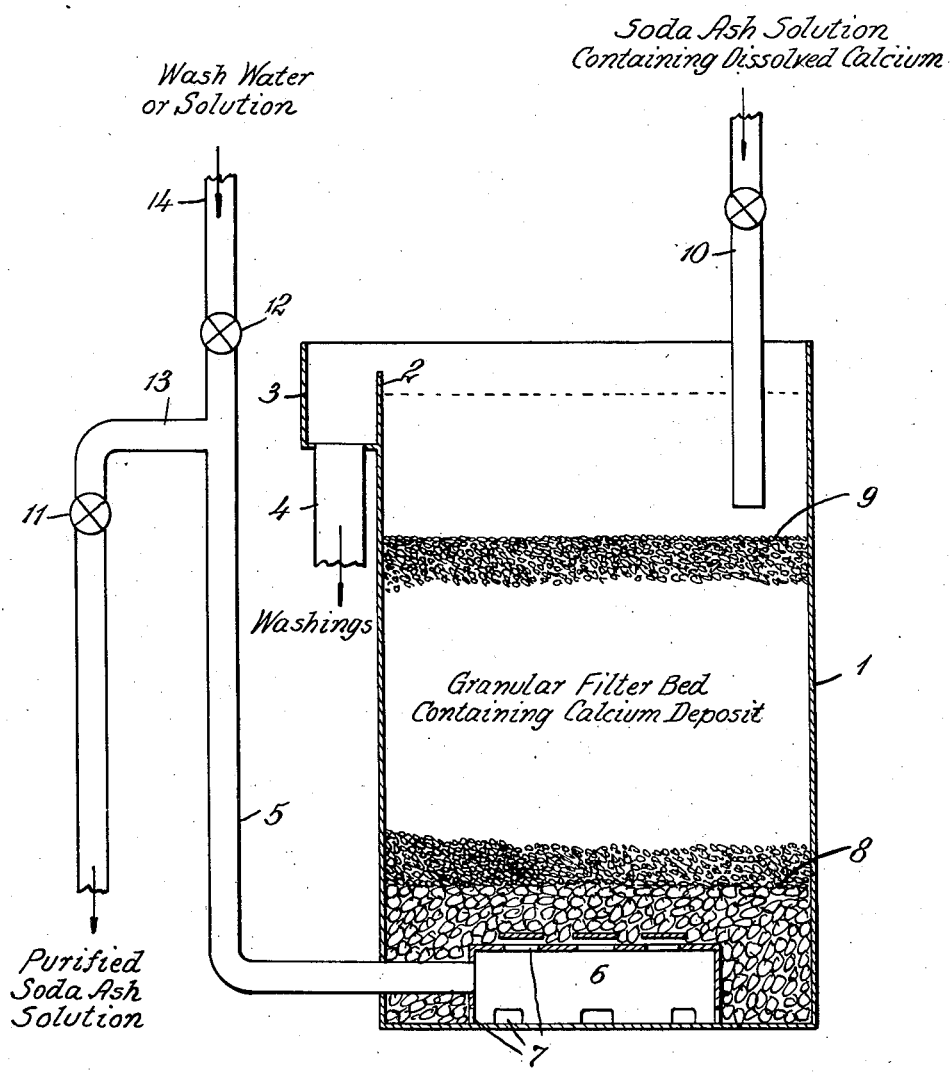

2,287,856

UNITED STATES PATENT OFFICE 2,287,856

PURIFICATION OF SODA ASH SOLUTIONS

Herman A. Beekhuis, Jr., Petersburg, and Ernest Gaskins, Hopewell, Va., assignors to The Solvay Process Company, New York, N. Y., a corporation of New York Application November 22, 1940, Serial No. 366,544

10 Claims. (Cl. 23—63)

This invention relates to the purification of solutions of soda ash to remove calcium compounds therefrom.

Commercial soda ash, as now produced and marketed, is a relatively pure material. Nevertheless, it still contains small amounts of impurities, among which is calcium. The calcium content of commercial soda ash varies from about 0.007% to 0.02%. When such a soda ash is dissolved in water to form a concentrated solution thereof, e. g. a solution containing 100 grams per liter or more $Na_2CO_3$, most of the calcium dissolves, either forming a true solution or a colloidal solution. The water used for making up solutions of soda ash frequently contains a small amount of dissolved calcium salts. The calcium in the water thus used further increases the dissolved calcium content of the soda ash solution. The dissolved calcium of these soda ash solutions cannot be filtered or settled from the solutions by ordinary methods of filtering through cloth or paper filters or treating the solution in settling tanks. Its presence in the soda ash solution causes severe scaling of the surfaces of equipment in which the solution is handled, for example, tanks, pipe lines, pumps, absorption towers in which the solution is used as an absorbent for gases, etc.

It is an object of our invention to provide a process whereby solutions of soda ash containing calcium as an impurity may have most of this calcium removed from the solution and thus reduce substantially or altogether avoid the scaling of apparatus in which the solution is subsequently handled.

We have discovered that if a concentrated solution of soda ash, one containing 100 grams or more $Na_2CO_3$ per liter, which also contains even small concentrations of calcium dissolved therein, is filtered through a bed of granular solid particles, calcium is deposited from the solution in the filter bed and, at least in part, forms a relatively adherent deposit in the granular bed. When resistance to flow of liquid through the filter bed is unduly increased by deposit therein of material carried by the solution, the flow of soda ash solution may be reversed, the solution now being passed upwardly through the filter bed to agitate the granules of the filter bed and to carry out of it finely divided solid particles deposited therein during filtration of the soda ash solution but to leave in the filter bed a calcium deposit which appears to be double salt of calcium and sodium carbonates. This backwashing of the filter bed may be followed by a filtration period, during which soda ash solution containing calcium is again introduced to the top of the filter bed and passed downwardly therethrough as in the first filtration period.

As the filter bed is employed in a sequence of several filtration and backwashing periods, double salt of calcium carbonate and sodium carbonate may be accumulated in the bed until it contains at least 0.25 pound of calcium which has been deposited therein from the soda ash solution containing calcium and sodium carbonates. As the calcium deposit accumulates in the granules of the filter bed, the degree of completeness with which calcium is removed from the soda ash solution in passing the solution through the filter bed increases. When the filter bed contains 0.25 pound or more deposited calcium for every 1 cubic foot of filter bed, most of the calcium is removed from the soda ash solution filtered through the bed. As the bed continues in use with more calcium being deposited therein, the amount of calcium removed from the soda ash solution increases until 90% or more of the calcium contained in the original soda ash solution is removed therefrom by filtration through the granular filter bed. The solution thus treated has little or no tendency to scale the surfaces of equipment in which it is handled or treated.

Our invention comprises filtering a concentrated soda ash solution containing dissolved calcium through a layer of granular material or granular filter bed containing at least 0.25 pound calcium per cubic foot of granular material, the calcium being in the form in which it is deposited from a solution containing calcium and sodium carbonates. As pointed out above, in this form the calcium appears to be combined as double salt of calcium and sodium carbonates. Analysis of the calcium deposit removed from soda ash solution by the process of this invention indicated it was a double salt containing one molecule each of $CaCO_3$ and $Na_2CO_3$ with water of hydration.

The granules of the filter bed used in carrying out our invention may consist of double salt of calcium and sodium carbonates. Or they may be of any solid material inert towards soda ash solutions with the deposit of calcium salt on and between the particles of that material. The granules are preferably of a material, such as comminuted chemical stoneware or crushed brick, which has a rough, unglazed surface to which the deposited calcium salt adheres firmly.

In filtering soda ash through a granular bed by the process of this invention, in addition to deposition of calcium as a double salt of calcium carbonate and sodium carbonate in the bed of granues, dirt and other particles of insoluble material which may be carried by the solution will deposit in the filter bed. This dirt and particles of insoluble material particularly tends to block further passage of the solution through the filter bed, although this tendency towards blocking of the filter bed is increased by calcium salt which is not deposited on the granules of the filter bed as an adherent coating. When the amount of fine solids in the filter bed unduly increases the resistance of the bed to further passage of the solution therethrough, the bed may be backwashed with water or, preferably, with soda ash solution. The rate of flow of liquid through the bed in this backwashing period should be sufficient to agitate the granular bed and carry off the finely divided material in it. The amount of liquid and the rate with which it is flowed through the bed in backwashing it is, however, limited so as not to remove the calcium deposit in the filter bed. Preferably, at least 50% of the calcium salt deposit in the bed at the end of a filtration period is left in the bed at the end of the subsequent backwashing.

In its preferred embodiment our invention comprises a process involving a series of repeated filtration and backwashing periods. A granular filter bed of a material such as chemical stoneware or crushed brick is first formed in a suitable vessel. Soda ash solution containing dissolved calcium salt is admitted to the top of the vessel and percolates through the filter bed therein, the filtered solution being withdrawn from the bottom of the vessel while maintaining the filter bed completely submerged in the soda ash solution. When resistance to flow of liquid through the filter bed is unduly increased by deposit therein of material carried by the solution, the downward flow of soda ash solution is cut off. Water, or preferably, soda ash solution is introduced to the bottom of the vessel and passed upwardly through the filter bed. The rate of flow of this water or solution is sufficient to agitate the granules of the filter bed and to carry out of it finely divided solid particles deposited therein during filtration of the soda ash solution but to leave in the filter bed more than 50% of the calcium carbonate-sodium carbonate double salt which has previously been deposited therein from the soda ash solution. This backwashing of the filter bed is followed by a filtration period, during which soda ash solution containing calcium is again introduced to the top of the filter bed and passed downwardly therethrough as in the first filtration period.

As this sequence of filtration and backwash periods is continued, the accumulation of deposited calcium salt in the filter bed increases and, after it amounts to 0.25 pound calcium or more for every 1 cubic foot of filter bed, continued use of the bed to filter the soda ash solution results in the desired removal of dissolved calcium from the solution.

It is preferred to pass the backwashing liquid, carrying with it finely divided solid from the filter bed, into settling tanks where it is kept long enough for the suspended solids to deposit and the supernatant liquid to clarify. The resulting clarified sodium carbonate solution is preferably used in the subsequent backwashing cycles for treatment of the filter bed.

The following example is illustrative of this invention but the invention is not limited thereto. The accompanying drawing shows an apparatus suitable for carrying out the process of this example.

In the drawing the numeral 1 designates a vessel open at the top and provided with an overflow dam 2 over which liquid may flow from the top of the vessel to a collector 3 from which it is withdrawn through a pipe 4. A liquid inlet pipe 5 at the bottom of vessel 1 leads into a distributing box 6 containing openings 7 through which the liquid may escape into the bottom of vessel 1. The bottom of the vessel is filled to the point above box 6 indicated by the line 8 with relatively large pieces of material insoluble in and inert towards soda ash solution. Above this material filling the bottom of the vessel there is deposited a bed of granular material filling the vessel for a depth of ten feet to the line designated by the numeral 9. This granular material is crushed chemical stoneware which gives porous particles having rough surfaces. These granules are preferably sized to 4 to 8 mesh. A pipe 10 is provided for introduction of liquid into the top of vessel 1 above the top of the filter bed therein. Pipe 5 rises to an overflow bend 13 at a height above the top 9 of the filter bed in vessel 1 but below the top of dam 2. Pipe 5 is connected with a branch pipe 14 having a valve 12 to control passage of liquid therethrough. A valve 11 controls passage of liquid from pipe 5 below the overflow bend 13.

In employing the above described apparatus for carrying out the process of this invention, a solution of commercial soda ash containing about 260 grams per liter of soda ash and about 30 to 40 milligrams or more per liter of calcium in the form of calcium compounds is introduced at a temperature of 55° to 70° C. to the top of vessel 1. The solution flows downwardly through the filter bed at the rate of 3 to 3.5 gallons per minute per square foot of cross-sectional area of the bed. From the filter bed the filtered solution enters box 7 in the bottom of the vessel and passes out of the vessel through pipe 5, valve 11 being open and valve 12 closed. By placing the overflow bend 13 in pipe 5 above the top of the filter bed in vessel 1, this filter bed is kept submerged in the soda ash solution, which is forced to flow through the filter bed by the difference in level between the top of the liquid in vessel 1 and the overflow bend in pipe 5.

As resistance to the flow of liquid in the filter bed increases, due to deposit of finely divided solid material in the filter bed from the soda ash solution, the level of the liquid in vessel 1 rises for a given rate of flow of liquid therethrough. Before the liquid level reaches the top of dam 2, the introduction of soda ash solution through pipe 10 is cut off, valve 11 is closed, valve 12 is opened and clarified soda ash solution, described below, is introduced through pipe 5. This solution is passed upwardly through the filter bed at a sufficient rate to agitate the granules and to suspend and carry out of the bed over dam 2 and out through pipe 4 the finely divided insoluble material in the bed. In backwashing the filter bed a charge of 7,500 gallons of clarified solution is passed through the bed at the rate of about 3,000 gallons per minute for a circular bed ten feet in diameter. This corresponds to a flow of about 38 gallons per minute per square foot of cross-sectional area of the filter bed. Finely divided material is thus removed from the filter bed while it still retains more than 50% of the calcium salt deposited in the bed at the start of the backwashing period. Valve 12 is then closed, valve 11 is opened and the soda ash solution to be filtered is again admitted through pipe 10.

The periods of filtration and backwashing are alternately repeated until the requisite quantity of calcium salt deposit has been formed in the filter bed to remove to the desired degree the calcium in the soda ash solution filtered through the bed. The soda ash solution passed through the filter bed in this preliminary stage of operation, containing a reduced amount of calcium, may be mixed with soda ash solution later filtered through the bed so that the calcium content of the mixed solution is suitably low. On the other hand, if desired, the filtered solution from the initial operation of a new filter bed may be again passed through the filter bed after the requisite deposit of calcium salt has been formed in the bed.

After the desired deposit of calcium salt in the filter bed has been deposited from the soda ash solution in the above manner, the sequence of filtration of soda ash solution and back-washing periods is continued and the solution from which calcium has been removed by passage through the filter bed is withdrawn for use.

As illustrative of the conditions in a filtration bed employing the process of this example to remove 90% or more of the calcium in soda ash solution, after a succession of filtration and backwash periods a sample of a granular filter bed made up of particles of chemical stoneware which had become coated with calcium salt, was taken from the bed after a backwashing period, the deposit of calcium salt was dissolved in hydrochloric acid and the calcium determined in the solution thus obtained. It was found that there was 1.67 pounds of calcium per cubic foot of the sample of granules taken from the bed. This corresponded to 90 pounds of calcium in the form of a calcium carbonate-sodium carbonate double salt in the 54 cubic feet of granular material making up the filter bed. After the succeeding filtration period the amount of calcium in the bed increased to 100 pounds and after the succeeding backwash period the calcium in the bed was reduced to 92 pounds.

The solution carrying finely divided insoluble material passing out through pipe 4 is held in settling tanks for a period sufficiently long for the solid material to settle out and the supernatant liquid to become clarified. This clarified liquid is used for subsequent backwashing treatments in the filter bed. In starting operations the first backwashing may be by means of water.

Depending upon the amount of calcium salt removed from the bed during the backwashing periods after the requisite deposit has been formed so that the bed is operating to remove the calcium from the soda ash solution to the desired degree, there may be a continued progressive accumulation of calcium salt in the filter bed. In time the accumulated salt may unduly increase the bulk of the filter bed until it is too large for satisfactory operation of the apparatus. Another effect of undue accumulation of calcium salt in the granules of the filter bed may be to increase the granular size until it is interfering with satisfactory filtration of the soda ash solution. When excessive amounts of calcium salt accumulate in the filter bed, the excess may be removed by dissolving it in hot water with the simultaneous passage of steam through the water. Instead of this, all or a part of the filter medium may be removed and treated with hot water or dilute acid to remove double salt therefrom. One may, of course, completely remove the double salt from the granules in the filter bed when the salt has accumulated therein to an undesired degree, and then resume operations in the manner described above as for a filter bed of the granular material initially placed in vessel 1.

The following are suitable conditions in filtering soda ash solutions in accordance with the process of this invention. Filter beds containing a layer of granular material of a depth of 2 to 20 feet, preferably 5 to 20 feet, may be used. Filter beds of depths within these ranges and of suitable granule size, give good removal of calcium from the soda ash solutions when the granular material contains the requisite quantity of deposited calcium salt, i. e. at least 0.25 pound calcium for every 1 cubic foot of granules. In beds of these depths the distribution of the calcium salt deposit will not necessarily be uniform, although the agitation of the bed in the backwashing periods will tend to promote a relatively uniform distribution of the deposit in the bed. It is obvious that so far as calcium removal is concerned, the filter bed may be of a depth indefinitely greater than 20 feet. One skilled in the art will recognize, however, the numerous disadvantages of employing beds of a depth greatly in excess of that required for accomplishing the desired removal of the calcium from the soda ash solution. It is possible in relatively deep beds to so operate that only one layer or portion of the bed contains substantial amounts of the calcium deposit which promotes the removal of calcium from the soda ash solution while another layer or portion of the bed may be relatively free from this deposit and hence does not operate to remove any substantial amount of calcium from the solution. For example, the upper part only of a body of granular material may contain the calcium deposit and act as a filter bed removing calcium from the soda ash solution.

The filter bed may consist of 2 to 50 mesh particles, preferably 4 to 8 mesh and of a fairly uniform size. In general, the larger the size particles the greater depth is required for the filter bed in order to obtain a given degree of removal of the calcium from the soda ash solution. On the other hand, an advantage in using particles of the larger size is that the filter bed may be used for treatment of soda ash solution for longer periods of time before backwashing of the bed is necessary than if a bed of smaller size particles is used. The granules making up the filter bed should be substantially inert towards soda ash solution and of a material having a rough, unglazed surface since this facilitates retention on the particles of a desired coating of calcium carbonate-sodium carbonate double salt. Crushed brick or chemical stoneware are only two of the many suitable materials for making up the filter bed but since they have a porous as well as rough and unglazed surface, they retain the desired calcium salt deposit particularly well and thus are preferred materials.

Although the rate of filtration of soda ash solution through the bed may be varied widely, in general as the rate of filtration increases, the tendency of the calcium salt in the soda ash solution to form an adherent deposit on the granules of the filter bed increases. The best rates of filtration will vary according to the size of the granular particles making up the bed. For a bed of 4 to 8 mesh particles it is preferred the soda ash solution be passed therethrough at a rate above 1 gallon (preferably at a rate of 2 to 4 gallons) of solution per minute per square foot of filter bed. For a bed of small granules, e. g. 50 mesh, the preferred rate is 0.5 to 1 gallon per minute per square foot while if the filter bed is of relatively large granules, e. g. 2 mesh, rates of 3 to 6 gallons per minute are preferred.

The solution may be filtered at any temperatures above its freezing point up to, for example, 100° C. The viscosity of the solution, particularly of nearly saturated soda ash solutions, is lower as the temperature is increased. It is preferred, therefore, to filter the soda ash solution at temperatures of 40° to 70° C., although it is not necessary that the temperature of the solution be raised above ordinary atmospheric temperatures.

In backwashing the filter bed the rate of flow of liquid through the bed should be sufficient to loosen and lift the granules of the bed somewhat but not enough to carry away the granules in the backwash liquid or to lower the amount of calcium salt deposit below that which makes the bed effective to remove calcium from the soda ash solution. The best rates of backwash will depend largely upon the size of the particles making up the bed. For example, the passage of backwash liquid at the rate of 35 gallons per minute per square foot cross-sectional area of the filter bed is suitable in backwashing a bed made up of 4 to 8 mesh particles.

The most practical arrangement with respect to direction of flow of the liquids through the filter bed is that of the above example; the soda ash solution to be filtered flowing downwardly through the filter bed and the backwash liquid flowing in the reverse direction upwardly through the bed. It is possible, however, to carry out the process of this invention with the liquids being passed through the filter bed in other manners. For example, the soda ash solution could be flowed upwardly through a filter bed and sludge removed from the bed by agitating it with water or soda ash solution and decanting off the liquid carrying in suspension finely divided insoluble materials deposited in the filter bed from the soda ash solution.

While we have set forth above suitable ranges for the several conditions which may be maintained in carrying out the process of this invention, these conditions are interrelated. For example, the most effective rates of passing the soda ash through the bed and the depth of the bed will vary depending upon the size of the particles making up the filter bed. In carrying out our process the several conditions may be so correlated that by filtering the soda ash solution through the bed of granular material containing double salt of calcium and sodium carbonates more than two-thirds of the calcium contained in the soda ash solution is readily removed therefrom. Since high efficiency of removal of the calcium depends upon the formation and maintenance in the granular filter bed of the deposit of calcium salt, the conditions under which the filter bed is backwashed to remove finely divided material deposited therein from the soda ash solution are preferably such as to retain in the filter bed more than 50% of the calcium salt deposit in the bed at the start of the backwash.

The calcium salt deposit present in the filter bed used in carrying out the process of this invention appears to contain calcium carbonate and sodium carbonate. Analysis of the salt deposited in a filter bed at 40° to 60° C. indicated the salt had a composition corresponding to the formula $CaCO_3 \cdot Na_2CO_3$ plus water of hydration. Although it appears the calcium salt deposited from solutions containing calcium and sodium carbonates which makes a granular filter bed effective to remove calcium from soda ash solutions is a double salt of calcium and sodium carbonates, this invention is not limited to this particular chemical constitution for the calcium salt deposit in the filter bed used in carrying out our process.

The following is a suitable method for determining the amount of calcium deposit in a granular filter media through which soda ash solution is filtered to remove calcium from the solution in accordance with the process of our invention:

Steep one volume of filter media in 10 volumes of distilled water at 75° to 100° C. for 24 hours. Stir occasionally to assist in loosening calcium scale from the filter media. Separate the resulting finely divided calcium carbonate sludge and dilute soda ash solution from the filter media with a screen containing openings materially smaller than the size of the filter media, e. g., 50 mesh screen for 4 to 8 mesh filter media. Rinse the filter media thoroughly with distilled water. Examine the filter media and repeat the above operation in case the calcium scale is not thoroughly removed. Separate the calcium sludge from the dilute soda ash solution and rinse water by filtration through paper. Dissolve the recovered calcium sludge in hydrochloric acid and analyze the resulting solution for calcium.

We claim:

1. The process for removing calcium from a concentrated solution of soda ash containing dissolved calcium salt which comprises filtering said solution through a filter bed of granular material inert towards said solution and containing an amount of calcium salt deposited from a solution containing calcium and sodium carbonates, corresponding to at least 0.25 pound calcium per cubic foot of the granular material.

2. The process for removing calcium from a solution of soda ash which comprises passing at a temperature not above 70° C. a solution of soda ash containing at least 100 grams per liter sodium carbonate and a substantial concentration of calcium compound through a filter bed of granular material inert towards said solution and containing an amount of calcium salt deposited from a solution containing calcium and sodium carbonates, corresponding to at least 0.25 pound calcium per cubic foot of the granular material.

3. The process for removing calcium from a solution of soda ash containing the same and containing 100 grams per liter or more sodium carbonate which comprises passing said solution through a filter bed of granular material inert towards said solution having a depth of 2 to 20 feet and being made up of 2 to 50 mesh particles containing an amount of a double salt of calcium carbonate and sodium carbonate corresponding to at least 0.25 pound calcium per cubic foot of the granular material, the soda ash solution being passed through said filter bed at temperatures not substantially above 70° C.

4. The process for the removal of calcium from a solution of soda ash containing the same in substantial concentration and at least 100 grams sodium carbonate per liter which comprises filtering said solution through a filter bed of granular material inert towards said solution and having a rough, unglazed surface, with alternate periods of filtration and of backwashing the bed to remove finely divided insoluble materials deposited therein in the filtration periods, said granular material containing an amount of calcium salt deposited from a solution containing calcium and sodium carbonates, corresponding to at least 0.25 pound calcium per cubic foot of the granular material whereby calcium is removed from the solution and deposited in said bed as a calcium salt during said filtration period, and in the backwashing periods washing the filter bed to remove finely divided solid deposited therein from said soda ash solution while retaining in said granular material the aforesaid amount of said calcium salt.

5. The process for the removal of calcium from a solution of soda ash containing at least 100 grams sodium carbonate per liter which comprises filtering said solution through a filter bed of granular material inert towards said solution with alternate periods of filtration and of backwashing the bed to remove finely divided insoluble materials deposited therein in the filtration periods, said filter bed containing granular material having rough, unglazed surfaces and containing an amount of double salt of calcium and sodium carbonates, corresponding to at least 0.25 pound calcium per cubic foot of granular material, the soda ash solution being passed through said filter bed at rates sufficiently high to deposit a calcium salt from the soda ash solution in the filter bed as an adherent deposit on said granular material, and in the backwashing periods washing the filter bed to remove finely divided solid deposited therein from said soda ash solution while retaining in said granular material at the end of the backwashing periods calcium salt deposited therein during the preceding filtration periods.

6. The process for the removal of calcium from a solution of soda ash containing the same in substantial concentrations and at least 100 grams sodium carbonate per liter which comprises filtering said solution through a filter bed of granular material inert towards said solution with alternate periods of filtration and of backwashing the bed to remove finely divided insoluble materials deposited therein in the filtration periods, said filter bed containing a layer 2 to 20 feet in depth of 2 to 50 mesh granular material having rough, unglazed surfaces and containing an amount of double salt of calcium and sodium carbonates, corresponding to at least 0.25 pound calcium per cubic foot of granular material, the soda ash solution being passed through said filter bed at temperatures not substantially above 70° C., whereby calcium is deposited from the solution in said bed as a double salt of calcium and sodium carbonates, and in the backwashing periods washing the filter bed to remove finely divided solid deposited therein from said soda ash solution while retaining in said layer of granular material at the end of the backwashing periods the aforesaid amount of said double salt of calcium and sodium carbonates.

7. The process for the removal of calcium from a solution of soda ash containing the same and at least 100 grams sodium carbonate per liter which comprises filtering said solution through a filter bed of 2 to 50 mesh granular material inert towards said solution and having rough, unglazed surfaces, with alternate periods of filtration and of backwashing the bed to remove finely divided insoluble materials deposited therein during the filtration periods, the soda ash solution being passed through said filter bed during the filtration periods at temperatures not substantially above 70° C. to deposit from said solution in the granular material a calcium salt and in the backwashing periods washing the filter bed to remove finely divided solid deposited therein from said solution while retaining in said bed at the end of the backwash periods said calcium salt deposited therein during preceding filtration periods and thereby accumulating in granular material of the filter bed a deposit of said calcium salt in amount corresponding to at least 0.25 pound of calcium per cubic foot of granular material and thereafter continuing the alternate periods of filtration of said soda ash solution through the bed containing accumulated calcium salt and backwashing of the bed to remove finely divided insoluble materials deposited therein in the filtration periods to recover by filtration of said solution through the filter bed a soda ash solution containing a materially reduced concentration of calcium as compared with the concentration of calcium in the original solution.

8. The process for removing calcium from a concentrated solution of soda ash containing dissolved calcium salt which comprises passing said solution containing at least 100 grams per liter sodium carbonate through a filter bed of granular material inert towards said solution and having rough, unglazed surfaces, said granular material containing an amount of calcium salt deposited from a solution containing calcium and sodium carbonates corresponding to at least 0.25 pound calcium per cubic foot of the granular material.

9. The process for preparing a solution of sodium carbonate low in calcium which comprises dissolving soda ash containing calcium salts as impurity in water in amount sufficient to form a solution containing at least 100 grams sodium carbonate per liter and filtering the resulting solution through a filter bed of granular material inert towards the solution which contains an amount of calcium salt deposited from a solution containing calcium and sodium carbonates corresponding to at least 0.25 pound calcium per cubic foot of the granular material and thereby removing from said solution the major proportion of the calcium contained therein.

10. The process for preparing a solution of sodium carbonate low in calcium which comprises dissolving soda ash containing about 0.007% to about 0.02% calcium in water in amount sufficient to form a solution containing at least 100 grams sodium carbonate per liter and filtering the resulting solution through a filter bed of granular material inert towards the solution having a rough, unglazed surface, with alternate periods of filtration and of backwashing the bed to remove finely divided insoluble materials deposited therein in the filtration periods, said granular material containing an amount of calcium salt deposited from a solution containing calcium and sodium carbonates corresponding to at least 0.25 pound calcium per cubic foot of the granular material, whereby calcium is removed from the solution and deposited in said bed as a calcium salt during said filtration period, and in the backwashing periods washing the filter bed to remove finely divided solid deposited therein from soda ash solution while retaining in said granular material the aforesaid amount of said calcium salt.

HERMAN A. BEEKHUIS, JR.
ERNEST GASKINS.